(12) United States Patent
Wright et al.

(10) Patent No.: US 10,898,814 B2
(45) Date of Patent: Jan. 26, 2021

(54) VIRTUAL GAMING SYSTEM AND METHOD

(71) Applicant: Highlight Games Limited, Surrey (GB)

(72) Inventors: Robert J. Wright, Palm Beach Gardens, FL (US); Stewart James Whittle, Hertfordshire (GB); Timothy Patrick Jonathan Green, Surrey (GB)

(73) Assignee: Highlight Games Limited, London (GB)

( * ) Notice: Subject to any disclaimer, the term of this patent is extended or adjusted under 35 U.S.C. 154(b) by 684 days.

(21) Appl. No.: 14/837,644

(22) Filed: Aug. 27, 2015

(65) Prior Publication Data

US 2016/0059135 A1    Mar. 3, 2016

(30) Foreign Application Priority Data

Sep. 3, 2014   (GB) .................................. 1415586.5

(51) Int. Cl.
*A63F 13/828* (2014.01)
*A63F 13/49* (2014.01)
*A63F 13/537* (2014.01)

(52) U.S. Cl.
CPC ............ *A63F 13/828* (2014.09); *A63F 13/49* (2014.09); *A63F 13/537* (2014.09)

(58) Field of Classification Search
CPC .............. G07F 17/323; G07F 17/3227; H04N 21/23439; A63F 13/828; A63F 13/49; A63F 13/537
See application file for complete search history.

(56) References Cited

U.S. PATENT DOCUMENTS

| | | | | |
|---|---|---|---|---|
| 2003/0027621 | A1* | 2/2003 | Libby | A63F 13/12 463/17 |
| 2004/0005918 | A1* | 1/2004 | Walker | G07F 17/32 463/16 |
| 2013/0095909 | A1* | 4/2013 | O'Dea | G07F 17/323 463/25 |

* cited by examiner

*Primary Examiner* — David L Lewis
*Assistant Examiner* — Robert E Mosser
(74) *Attorney, Agent, or Firm* — Patent Ingenuity, P.C.; Samuel K. Simpson

(57) ABSTRACT

A virtual interactive archive video sports game configured to generate a virtual gaming match between two opponents is disclosed. The system includes a user input, a video clip database, a challenges database, a display and a processor. The user input is configured to receive at least one opponent selection input and at least one challenge selection input. The video clip database is configured with a plurality of video clips between the two opponents. The challenges database is configured with a plurality of challenges relating to the video clips in the video clip database. The display is configured to present the video clips, challenges and results data to the user. The processor is configured with a virtual match selection engine configured to randomly select more than one video clip between the two opponents, a challenge selection engine configured to randomly select at least one challenge from the challenge database and receive at least one challenge selection input and a results engine configured to generate results data based on whether or not the challenges are met by the randomly selected video clip, between the two opponents.

2 Claims, 13 Drawing Sheets

VIRTUAL GAMING SYSTEM AND METHOD

CROSS-REFERENCE TO PRIOR FILED APPLICATIONS

This application claims priority to earlier filed GB provisional application GB1415586.5 filed Sep. 3, 2014, which is incorporated herein in its entirety.

FIELD OF INVENTION

The present invention relating to improvements in gaming systems and methods, including electronic interactive archive video virtual sports-based gaming systems and methods.

BACKGROUND

For many people, other than actually playing a sports game, considerable enjoyment may be had by spectating or playing virtual sports games electronically or by having our knowledge and skills tested based upon a sports game.

Sports-based games are popular and exist in a number of forms. Interactive electronic sports-based games can incorporate challenges to a user to test their observation, skill and logic. In one familiar system a console or terminal is linked to a database that provides images of a football match in which the image of the ball is removed from the scene of the pitch at a select stage and where the user of the system is invited to 'spot-the-ball', predicting where the ball is located in the scene of the pitch at that time. In such games the images are commonly virtual images of game-play and the user's skill and knowledge is normally tested only within a very limited frame of reference.

It is an object of the present invention to address limitations of prior art interactive sports based game systems, providing a novel and exciting electronic interactive archive video virtual sports-based gaming experience.

SUMMARY

In a first embodiment there is provided a gaming system for electronic interactive archive video virtual sports-based games which comprises a video display screen, a processor and a user interface. The processor is operatively linked to a video database that holds a plurality of archive video clips from a plurality of prior recorded/filmed real sports events from an inter-related group of sports events. Such sports events may include any form of sporting event in league or tournament play including but not limited to football (soccer), tennis, basketball, ice hockey, american football (NFL), baseball or any other sport or tournament or multiple years of tournaments. The processor is configured to play a selected short video sequence on the video screen. In one example, the video sequence length is of the order of under 5 minutes but can be any duration longer or shorter, so long as it is comprised of random archive video clips. A user is invited or prompted to choose a winning team (team sports) or player (one-on-one sports such as tennis) or to predict another aspect of the sports event (such as the ultimate score).

The system may be configured for the processor to invite and enable the user to select a first team or player (opponent 1) and a second, opposing, team or player (opponent 2). The processor is configured to access multiple suitable video clips from the archive video database from a sports event between opponent 1 and opponent 2. The system may be configured so that the archive video sequence ultimately produced is selected by the processor randomly choosing from a plurality of archive video clips in the database that are suitable, e.g., one of the archive video clips including opponent 1 and opponent 2. In a variant the system may be configured so that the video sequence is selected by the user from a range of options presented by the processor.

The system is suitably configured to allow the user to play the game system solo or with and against other users. The selection of the opponent 2 may be made by a second user using the system with the first user and in such case the system preferably has screen displays with display fields to display each user's identifier name or initials against their chosen team or player or against their score or result at the end of the use.

The archive video clips in the video database are preferably stored with data, or tags linking to data, designating the opponents playing. Preferably the data or tags linking to data include the match score and a number of other challenge-related attributes of the sports event in the video sequence.

The database may be a remote/on-line computer database or may be local to the processor and user, housed within a console that also houses the processor and video display screen.

All embodiments provide a dimension of fun/involvement and skill-testing that is quite different from and often more profound than the prior art systems provide.

BRIEF DESCRIPTION OF THE DRAWINGS

A preferred embodiment of the present invention will now be more particularly described by way of example with reference to the accompanying drawings, wherein.

DETAILED DESCRIPTION OF THE EMBODIMENTS

Figure 1:
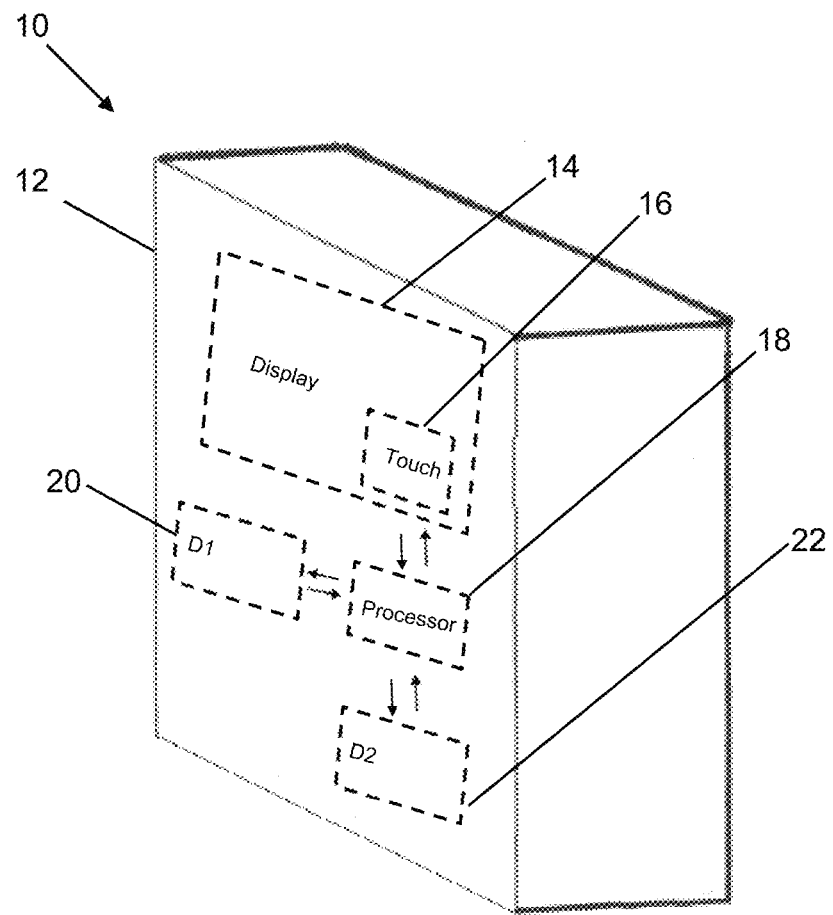
FIG. 1 is schematic diagram of an arcade machine embodying the gaming system.

In a first embodiment of the invention illustrated in FIG. 1 the system comprises a console 10 formed as a floor-standing coin or token-operated arcade machine or betting terminal slot or video lottery terminal machine having a housing 12. The housing 12 includes a video display screen 14 with a touch-screen interface 16 to provide instructions/selections to a processor 18. The processor 18 is linked to a database of archive video clips D1 (20). The processor is also linked to a database of challenges D2 (22) that are selectively presented to the user on the video display screen 14. The challenges database D2 may be separate from the video database D1 or integral with it.

In one example the database of video clips D1 holds archive video footage suitably recorded from hundreds or even thousands of actual league or championship football matches, but can be from any type of sports event, spread across many seasons and suitably across several decades and representing substantially all teams who play in football tournaments. The archive video footage is suitably in the form of short video clips that can be of any duration, which are stored with metadata or tags storing a variety of parameters including: the identity of the teams or opponents playing, the match score and a number of other challenge-related attributes of the football or other sports matches. The archive video footage may be of key stages in a match such as of the run up to or act of scoring of a goal, both for heightened user interest and as a point of reference for the user and as a basis for a primary challenge or side challenges.

Figure 2:
FIG. 2 is a screenshot of the display screen during the selection of opponent 1 in a first stage of operation of the gaming system.
Figure 10:
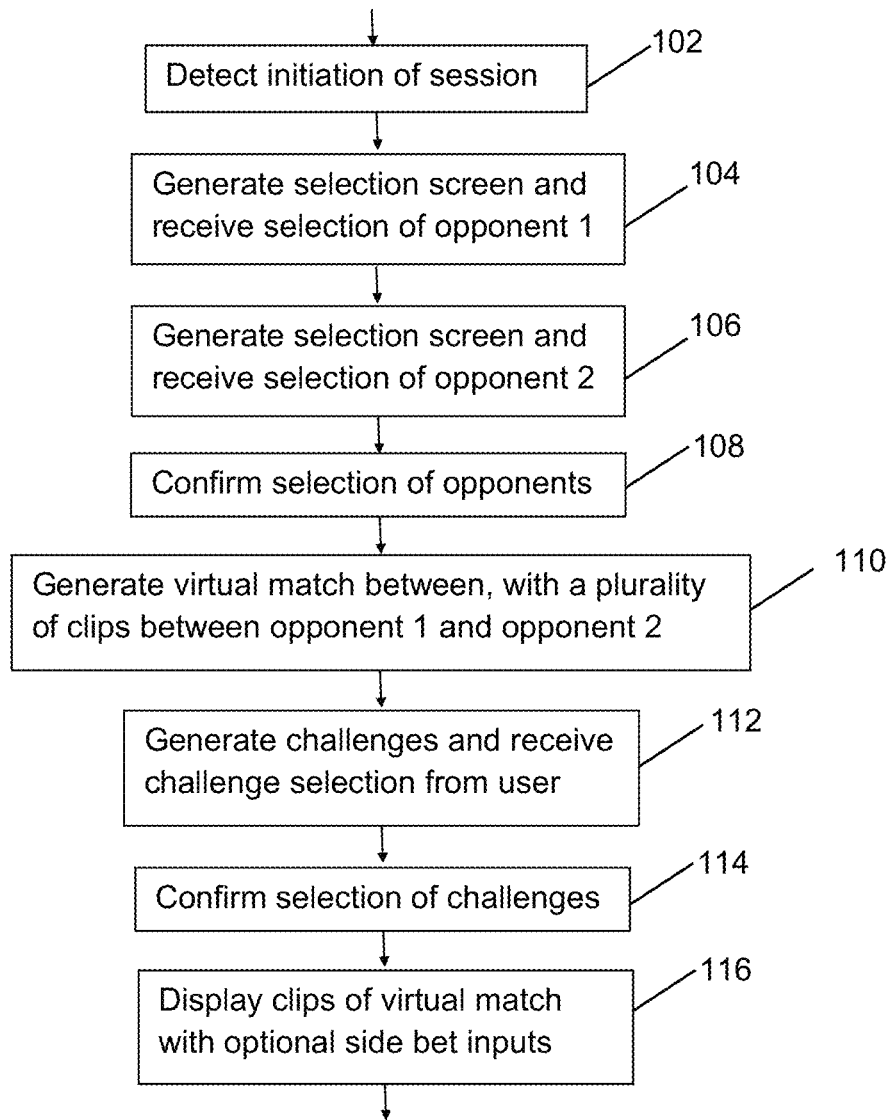
FIG. 10 is a flowchart showing system the processing carried out by processor during system operations.

FIG. 2 is a screenshot 30 of the display screen 14 during the selection of opponent 1 in a first stage of operation of the game system. FIG. 10 is a flowchart showing system the processing carried out by processor 18 in carrying out system operations. It should be understood that any flowcharts contained herein are illustrative only and that other program entry and exit points, time out functions, error checking routines and the like (not shown) would normally be implemented in typical system software. It is also understood that system software/firmware may run continuously after being launched. Accordingly, any beginning and ending blocks are intended to indicate logical beginning and ending points of a portion of code that can be integrated into a main program and called as needed. The order of execution of any of the blocks may also be varied without departing from the scope of this disclosure.

The processor 18 determines when a user initiates a session of use of the game system by detecting the insertion of a coin or token into the machine or a suitable form of electronic credit as shown in FIG. 10, block 102. The processor generates a video display screen 30 (FIG. 2) that comprises a menu of options in choice of first team or opponent 1. In this example the user, via touch screen interface 16, selects one of the twenty teams presented. In the alternative, the user may select the random button 34 and the processor 18 makes a random selection of one of the teams 32 as opponent 1 (36). Option may also be given to change the selection of opponent 2 or the team selected by the user can then choose to play versus "The Rest". This is a random selection of clips of all other teams who have played the player's chosen team. The selection of opponent 1 is also shown generally by block 104 in FIG. 10.

Figure 3:
FIG. 3 is a screenshot of the display screen showing the selection of opponent 2.

The processor 18 generates a video display screen with a menu of options for choice of opponent 2 from among the teams that were not selected as opponent 1. FIG. 3 is a screenshot 38 of the display screen 14 showing the selection of opponent 2 (40). If playing with friends/others the opposing team may be selected by the other user or when playing solo the user selects both first and second teams for the match they wish to be seen played. In the alternative, the user may select the random button and the processor 18 makes a random selection of one of the teams as opponent 2. Option may also be given to change the selection of opponent 2. The selection of opponent 2 is also shown generally by block 106 in FIG. 10.

Figure 4:
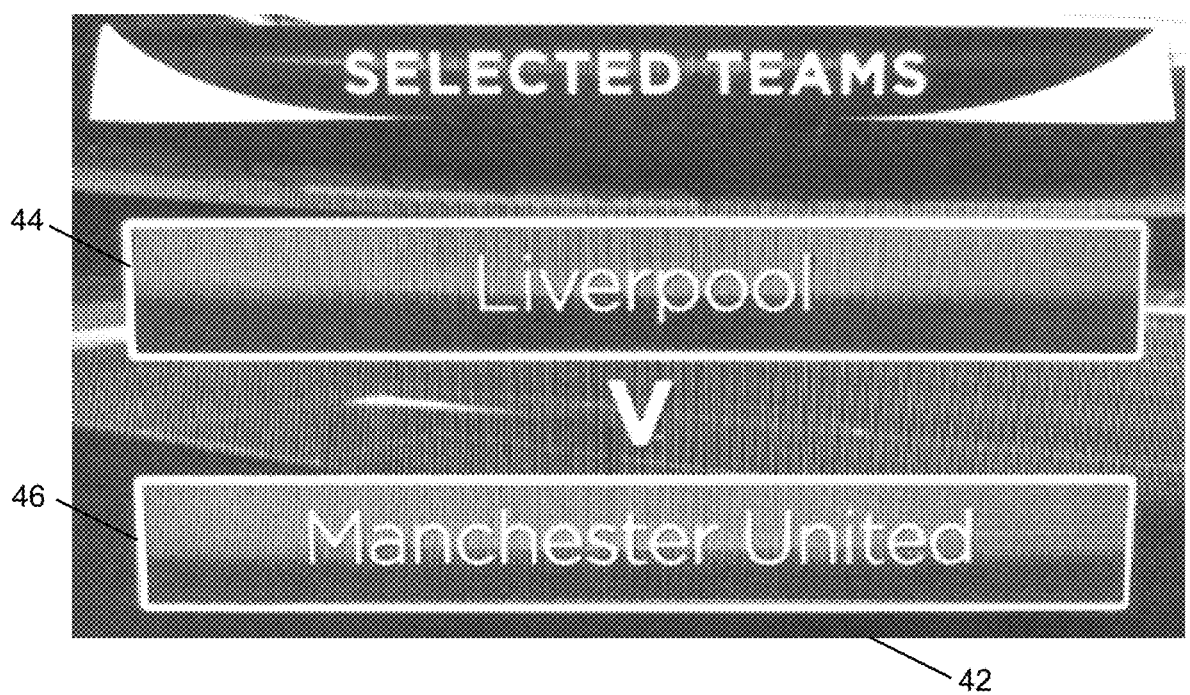
FIG. 4 is a screenshot of the display screen.

The processor 18 generates a display screen showing the draw, showing the names of the two selected teams playing against each other. FIG. 4 is a screenshot 42 of the display screen 14 confirming the selection of opponent 1 (44) and opponent 2 (46). The presentation of the confirmation screen is also shown generally by block 108 in FIG. 10. In order to generate a virtual game or match between opponent 1 and opponent 2 the processor 18 will select suitable corresponding archive video clips from the database D1 of historic match video clips. Since the potentially suitable match video clips may come from scores or hundreds of clashes between those teams historically, the processor 18 may be configured to randomly select among the many clips that carry a data tag that corresponds to the two chosen opponents. This is generally shown in block 110 of FIG. 10.

Figure 5:
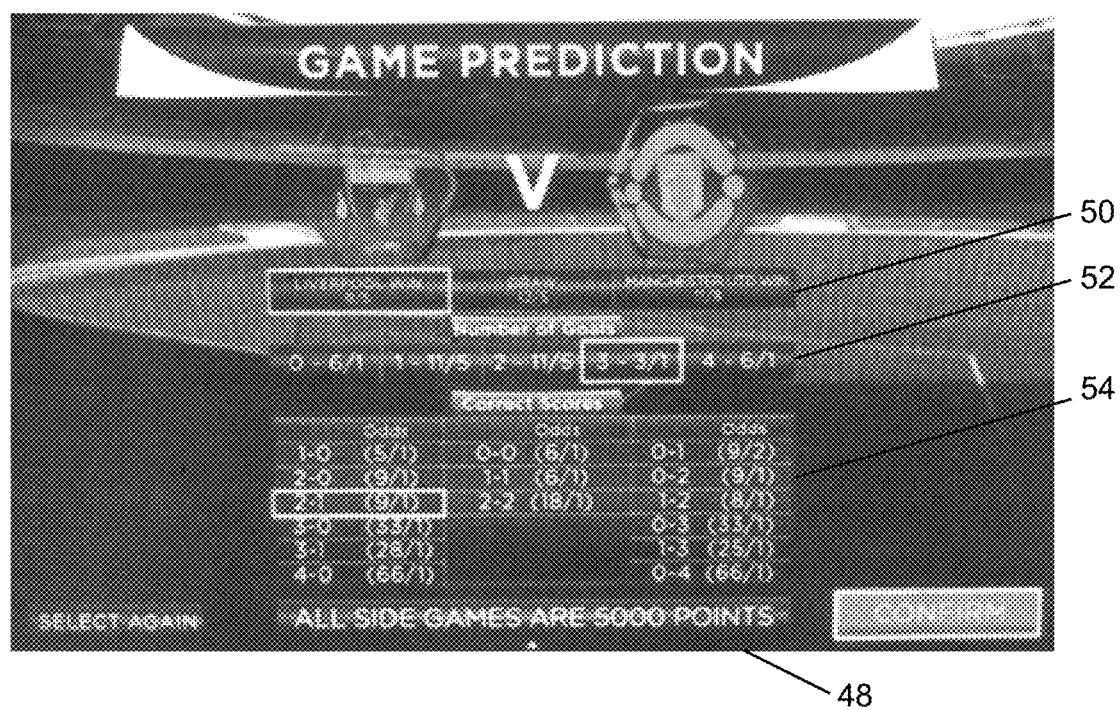
FIG. 5 is a screen shot of the display screen presenting the challenges for the selected match.

The processor 18 selects one or more challenges from the challenges database D2 and generates a corresponding display screen. FIG. 5 is a screen shot 48 of the display screen 14 presenting the challenges for the selected match. The challenges may include, e.g., to predict the result of the match in terms of which team wins 50, to predict the number of goals scored in total 52 and to predict the goal scores of the teams 54. Each of a plurality of possible outcomes for each of these are displayed. In the illustrated example the 'bookie' odds or it can be decimal odds, of a given one of the possible outcomes coming to pass is also shown alongside the possible outcome. This enables the user to experience an element of the gambling experience had by gamblers betting on real events live. As previously, the user enters their selection using the touch screen interface 16 as generally shown in block 112 of FIG. 10.

Figure 6:
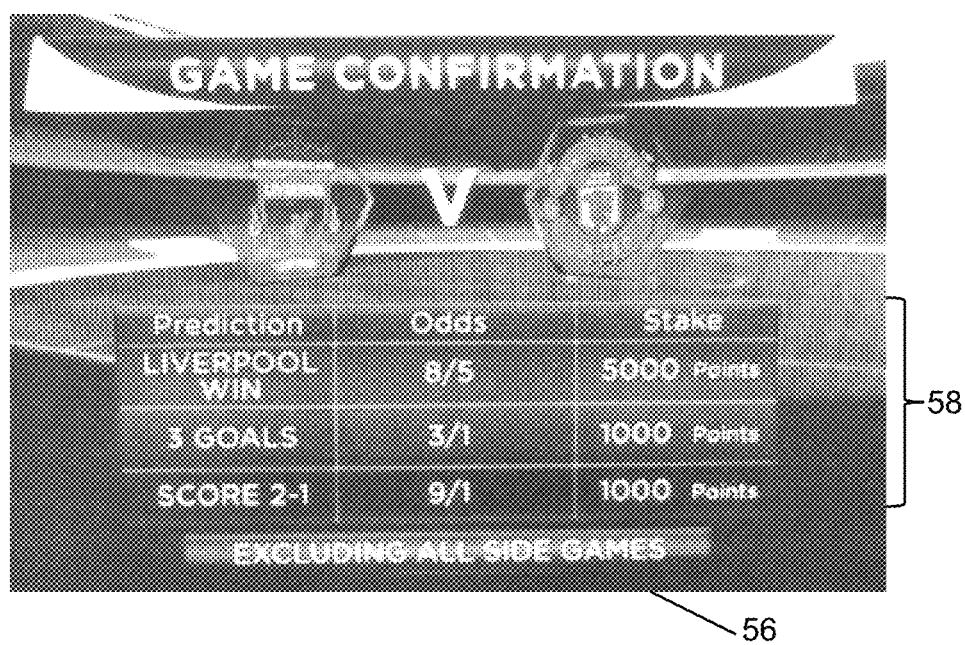
FIG. 6 is a screen shot of the display screen confirming the challenge selections.
Figure 7:
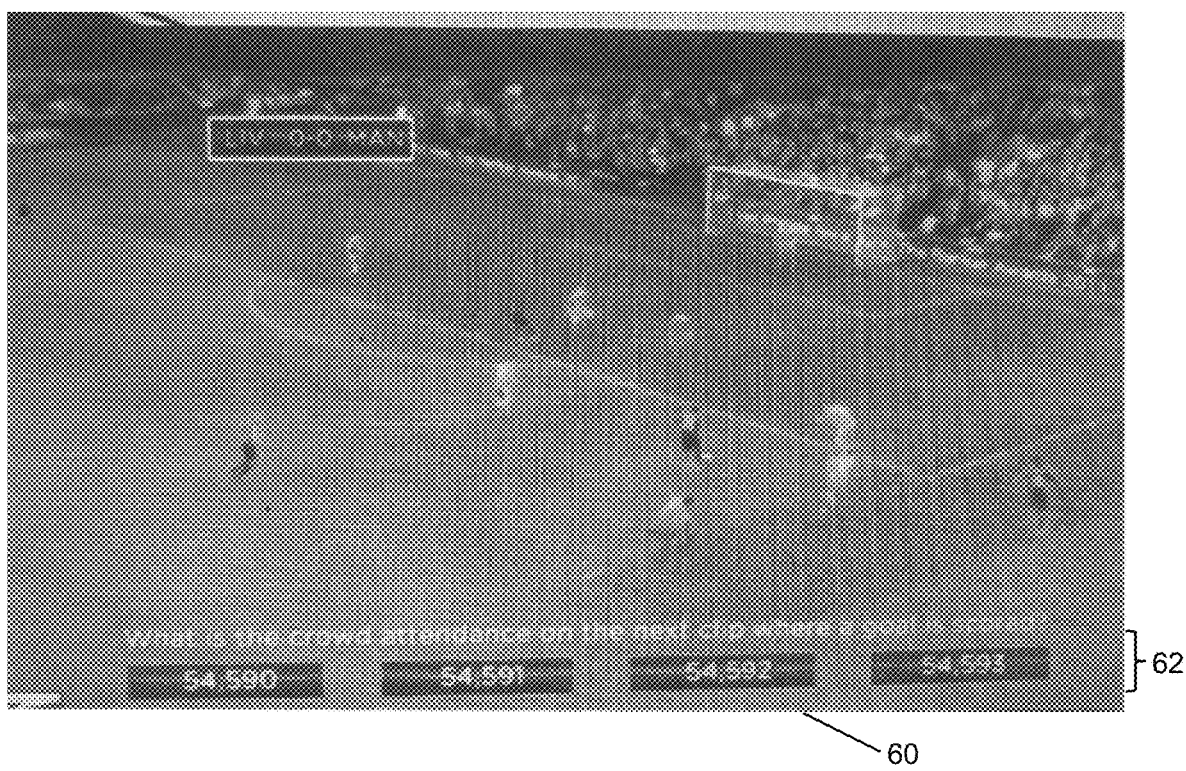
FIGS. 7 and 8 are screen shots of the display screen showing frames of the video clip(s) for the selected match.
Figure 8:
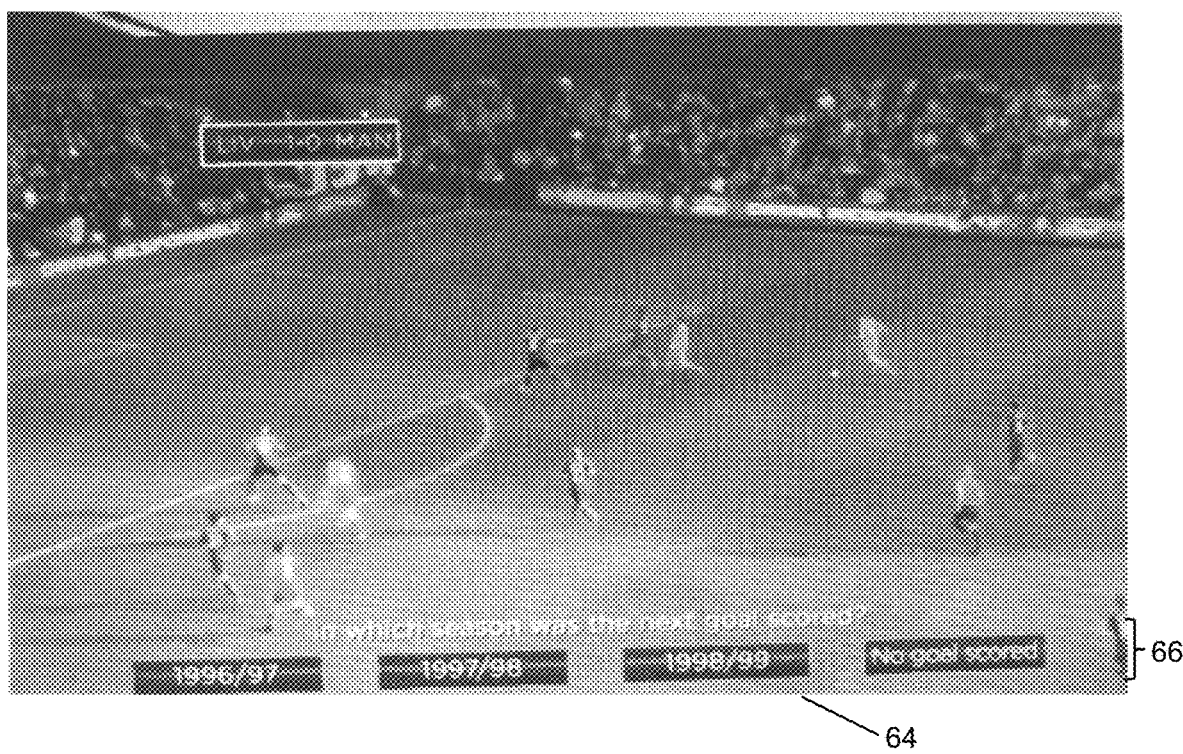

FIG. 6 is a screen shot 56 of the display screen 14 confirming the challenge selections 58. In this example the user's challenge selections (predictions) are presented in a table just prior to the processor 18 initiating playing of the chosen video sequence(s) on the display screen 14. FIGS. 7 and 8 are screen shots of the display screen showing frames of the individual video clip(s) from within a game sequence for the selected match.

FIG. 7 is a screen shot 60 from the virtual match. FIG. 7 also includes an optional feature, the provision of a subsidiary challenge/side bet 62 in which the processor 18 invites the user to predict a further attribute of the match being displayed but the challenge refers to the next clip to appear and not the current image displayed. This is generally shown by block 116 in FIG. 10. The further attribute is suitably an aspect of the remainder of the video clip yet to be shown. In this case the challenge being posed is for the user to guesstimate or predict the match attendance. The challenge could be made a chance bet or such that the user can exercise their observational skill to accurately assess or predict this. FIG. 8 is a second screen shot 64 from the virtual match. In FIG. 8 a further subsidiary challenge/side bet 66 is presented to the user, this time to test their knowledge by challenging them to identify which football season the match took place in. It should be understood that a wide variety of subsidiary challenges may be used without departing from the scope of this disclosure and they can take the form of both skill and chance challenges.

Figure 9:
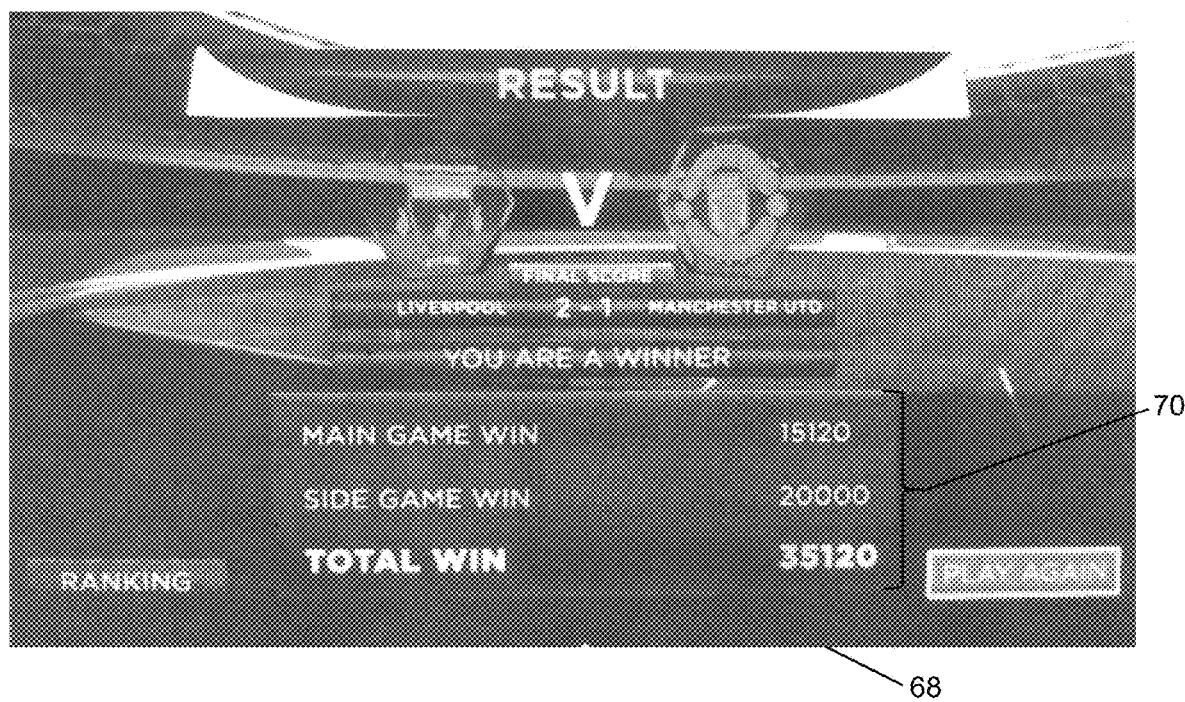
FIG. 9 is a screen shot showing the results of the played match.

FIG. 9 is a screen shot 68 showing the results 70 of the played match. This screen is applicable for the game played in the context of real money gaming and also social gaming. The results include the final score between the teams as well as the scores achieved by the user in the challenges they have played. In this example the user is shown as having won 15120 credits from correct predictions of the main game challenges and a further 20,000 from the subsidiary challenges.

In alternative embodiment, the video database may be located externally and accessed via a network e.g., online/internet server or within an intranet network accessed via cables or wirelessly. The database(s) D1, D2 may also be remotely located and accessed via a network. The video display screen 14 may be the video display screen on the user's electronic media device, as for example of a smartphone, tablet, phablet, PDA, laptop, desktop or other such device. The processor 18 may be the processor of such a device alone or in combination with a server. In such cases the database will generally be accessed from an on-line server.

Figure 11:
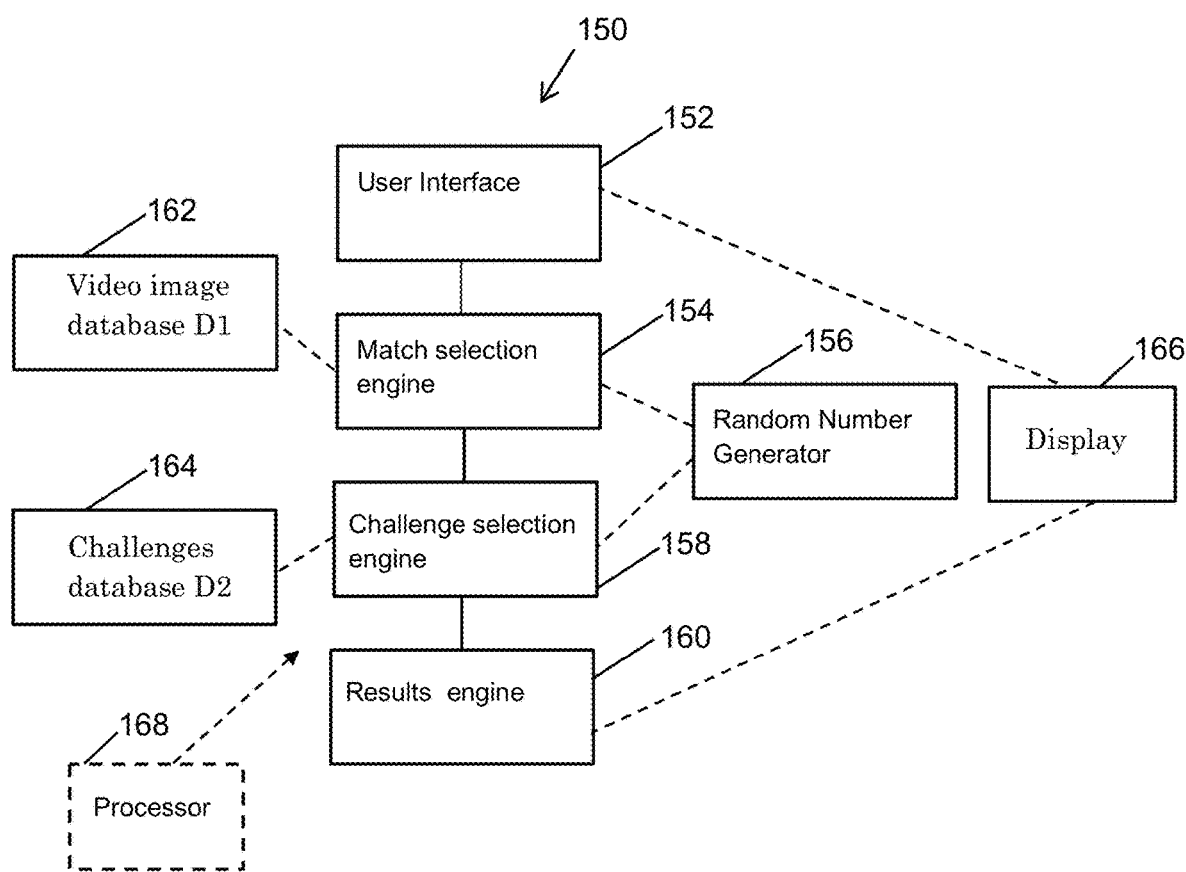
FIG. 11 is a more detailed block diagram of a system implementation.

FIG. 11 is a more detailed block diagram of a system implementation. The system 150 includes a user interface or user input 152 configured to receive at least one opponent selection input and at least one challenge selection input. A archive video clip database 162 is configured with a plurality of archive video clips between the two opponents. As discussed above each of the video clips are stored with associated metadata or tags storing a variety of parameters including: the identity of the teams or opponents playing, the match score and a number of other challenge-related attributes between the teams or individual players in any professional sport. A challenges database 164 is configured with a plurality of challenges relating to the video clips in the archive video clip database 162. The challenges may include a variety of questions relating to the match, e.g., to predict the result of the match in terms of which team wins, to predict the number of goals scored in total and to predict the goal scores of the teams. A display 166 is configured to present the video clips, challenges and results data to the user.

A processor 168 is configured with a virtual match selection engine 154, a challenge selection engine 158 and a results engine 160. The virtual match selection engine 154 is configured to randomly select (e.g., via random number generator 156) more than one video clip between the two opponents. The challenge selection engine 158 is configured to randomly select at least one challenge from the challenge database 164 and receive at least one challenge selection input. The results engine 160 is configured to generate results data based on whether or not the challenges are met by the randomly selected video clips between the two opponents.

To implement side bets effectively the answers presented to the player may come from a list of outcomes available in the video clips in the database. This prevents the player from learning or researching viable answers and so eliminating options from those presented to him. After the player has made their selection the results engine will determine if the side bet wins and a suitable video clip or display screen is generated to show this result. This approach make side bets on attendance, month, featured player and commentator all possible assuming there are sufficient clips for each outcome.

The user's experience of using the game system can be one of freeplay, freemium play, virtual currency, gambling play with pay-outs, social play with and/or against other users, on-line or off-line. The user can play for rewards that are monetary or credits, including credits for extended gameplay or extra game levels or other collectibles or simply play for the kudos of a high score or beating one or more competitors/opponents. The play can be structured as a fantasy league incorporating league tables and chat room functionality if desired using any combinations of teams as first team and opposing teams.

The side bets offered may be bets/challenges of chance but can be challenges testing skill and suitably concerning the 'current' visible or next "yet to be seen" bit of footage. In the version of the game shown the user selects his or her team or the team is randomly selected. In another version the user may select a team to play against the 'best of the rest' or a random selection of action between the chosen team and compilation of action against that chosen team e.g. Liverpool v The Others or the Best of the Rest.

In preferred versions of the game system the game could take the form of a knockout tournament where the players chosen team then plays against random teams selected by another player. This tournament "trophy" style version of the game would result in teams being eliminated to produce an overall winner. Another variant would involve teams playing against one another in a league or in another version a cup competition that combines elements of a league and knock-out style of play (so similar structure to Champions League style of play). Whilst these 'tournament' style games are intended for fantasy, social, free play they could also be played as real money games.

In another variant of the game users would be able to chat to one another using a chat room feature. Here they could exchange comments about football gossip, predictions about games, or even thoughts on current games tournaments and leader boards whilst they are playing the games.

In all games the video footage shown is from real live archive action from any professional sports league that has been filmed or recorded and may include international matches and foreign league matches. The video footage shown can include the original commentary of the matches shown or a new commentary could be created and played with the footage.

The subsidiary challenge/side bets for the recorded real match action could be any elements of in match action, including questions relating to but not limited to, goals scored, saves, misses, tackles, crowd sizes, crowd scenes, fouls, referee decisions and cards awarded. The main game archive live footage shown could be any elements of in game action such as goals scored, saves, misses, tackles, crowd scenes, fouls, referee actions and decisions. Whereas the exemplified embodiment shows the game system configured to offer one or more subsidiary challenges/side bets, in other examples the main game only is played i.e. with only the main challenge(s).

A more detailed random game clip video selector system and database design is presented below. The system includes a database of archive video clips containing unique individual archive sports game clips as disclosed above. The archive clips are stored in one or more locations that can be accessed for display. Selection of the archive video clips to display is accomplished using a random number generator (RNG). Based on a predetermined outcome created by the RNG, a clip sequence of any number greater than one (1) is compiled. The sequence time duration can be selected and concatenated for display until the allotted time, +− allowed deviation, has been realized.

In more detail, a random selection of categorized archive video clips are displayed to a user on demand or at predetermined time intervals. To accomplish this, the archive video clips must be stored in a location accessible by the display system. A database table contains information about each archive video clip and this information is accessible by the display system. An index number is assigned to each archive video clip. The table contains a record for each archive video clip. This record generally contains: a pointer to each team, a pointer to the game date, a pointer to significant actions in the clip, a link to the game location, a link to the team home location, the length of the video, the video codec information, the path to the storage location and the file name as stored on the storage location. Additional tables contain information about games played, game locations, team names with home locations, player names and user definable fields.

Figure 13:
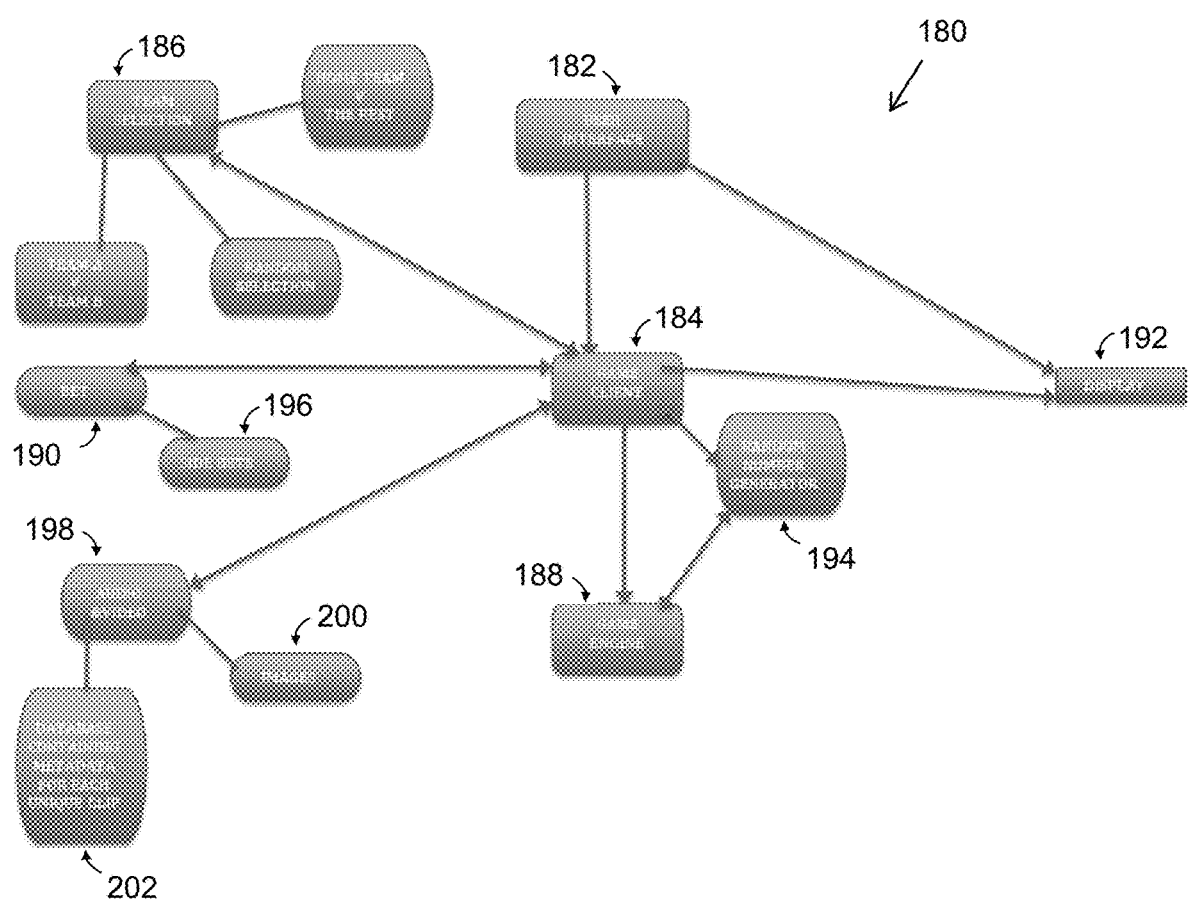
FIG. 13 is a process flow diagram showing processing steps for the gaming system.

FIG. 13 is a process flow diagram 180 showing an example sequence of events starting with user interface 182 to set parameters to obtain the display of video clips within the user defined guidelines. The final results are displayed to the user in video format.

The Game Client 184 contains all the graphical and video information that is supplied to the user. The Game Client provides to the user a filter option where a pair of teams is selected 186. Additional filtering can be imposed based on game date, location, player or any user-defined field. To select filter options the database fields are displayed to the user interface as pull downs (or other as designed) allowing the user to have a real time view into the available options to select from. All fields are eligible for use as a filter and can be displayed as a pull down to be used for the selection process.

The Game Client 184 then communicates the user team selection to the Game Engine 188. The Game Engine creates betting options 190 based upon the outcome between the selected team play options and transfers that information to the Game Client, which displays the options to the user via the display 192. Betting options are not limited to one request and can be expanded to include side bets 196. Side bets can be made at the start or during play. They are questions linked to metadata contained in the database and attached to each unique video clip. Once the bet is confirmed, the Game Client communicates with the Random Number Generator 194, which in turn provides a game result.

Once the Random Number Generator 194 has created a result it transfers that information to the Game Engine 188. The Game Engine 188 has preset parameters for the sequence length. Sequence length can be varied and customized by the game supplier but it is always comprised of video clips greater than one (1). The maximum video time to display is a fixed value defined in seconds and a range of under and over max time to display is used for calculating the maximum combined time of multiple video clips. When a video clip is selected the Video Length in seconds is added to the total run time. The selection will be repeated until the defined time window is filled. A turbo play variation may also be provided in which the clip size is reduced to encapsulate key action sequence determining the clip outcome. The Game Engine 188 determines what video clips are required to create the requisite sequence and the bet outcome. This information is then communicated to the Game Client 184.

The Game Client 184 controls video image selection as shown by block 198 based upon the information received from the Game Engine 188. Using the video database 200 and metadata 202 it constructs a sequence of video clips to represent the game outcome. If the video clip ID has already been selected in a previous pass in the current session it is rejected and a new selection is made.

Figure 12:
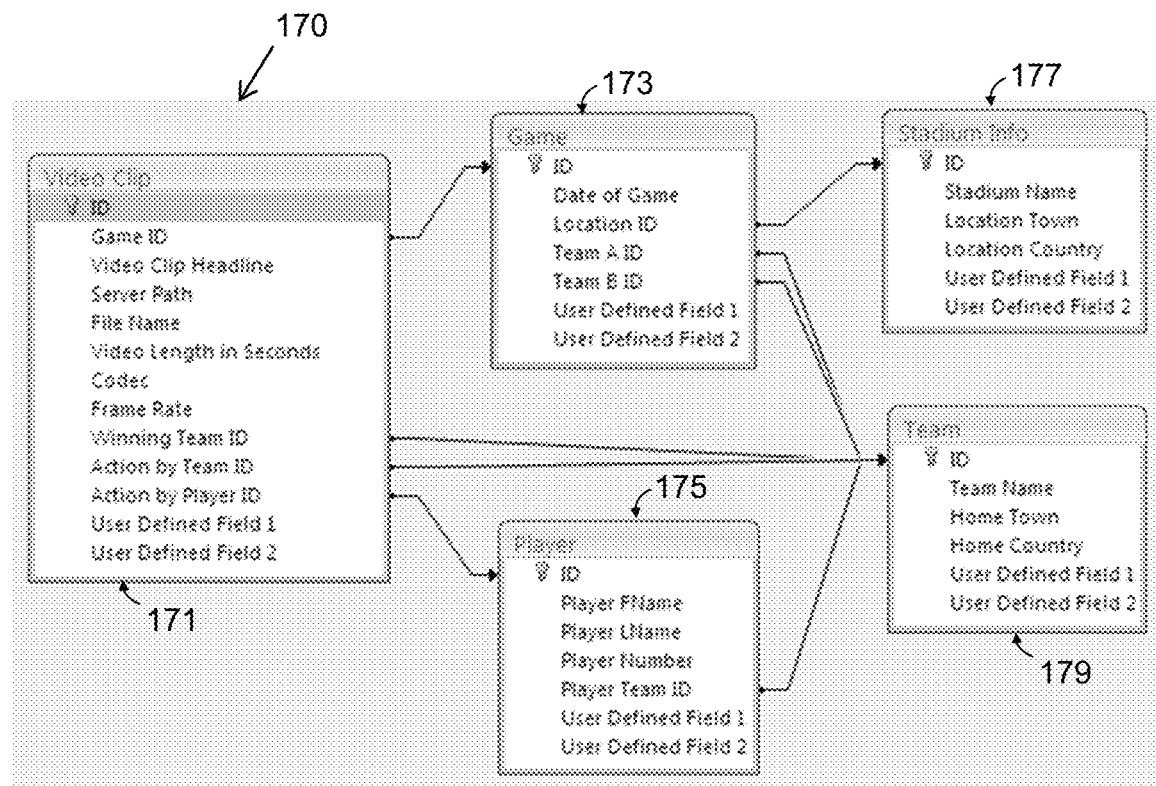
FIG. 12 is a block diagram of a database design.

FIG. 12 is a block diagram of a database design 170. The selection parameters are embedded into a sequel select statement and submitted to the database. The select statement returns columns including but is not limited to: video clip id, video clip headline, Server Path, File Name, Video Length in Seconds, Codec and Frame Rate.

Database interaction with a predefined schema is used to maintain and access information required to select video clips and to tie the video clips to additional information describing the content of the video clip.

A database table (video clip table 171) is used to track and maintain the location of the video clip for retrieval. Additional links tie to indexes in other tables to bring in more information for filtering and detail information. Fields in the video clip table 171 include but are not limited to: ID is the index number of the Video Clip identifier. This is unique for each Video Clip and is used as part of the randomized selection process. Game ID is the numeric index ID of a record stored in Game table.

Video Clip headline is a user defined text description of the Video Clip. Server Path is the connection information used to access the server that contains the actual video clip file(s). File Name is the Video Clip file name as it is stored on the server. Video Length in Seconds contains a numeric value describing the time duration of the Video Clip. Codec described the video display engine required to display the video. Frame Rate describes the frame as required for time calculations and Codec configuration. Winning Team ID is the numeric index ID of the team that won the game the clip came from. Action by Team ID is the numeric index ID of the team noted as having significant accomplishments in the Video Clip. Action by Player ID is the numeric index ID of the Player noted as having significant accomplishments in the Video Clip. User Defined Field 1 and User Defined Field 2 are for expansion of functionality or periodic special events requirements.

Another database table is used to track and maintain game information (Game Table 173). The ID is used by the Video Clip Table Game ID field to link to the correct record in Game table. Date of Game is the date the game was played on. Location ID link to the Stadium Info table 177. Team A ID and Team B ID links to the Team table to identify the two teams playing in the game. User Defined Field 1 and User Defined Field 2 are for expansion or periodic special events requirements.

Another database table is used to track and maintain Stadium information (Stadium Info Table 177). The ID is used by the Game Table 173 to identify the location the game was played at. Stadium Name is the official name of the Stadium. Location Name is town, province or local text description of the stadium location. Location Country is text describing the country the stadium located in. User Defined Field 1 and User Defined Field 2 are for expansion or periodic special events requirements.

Another database table is used to track and maintain Player information (Player Table 175). The ID is used by the Video Clip Table to identify the player of note in the Video Clip. Player FName contains the text for the player's first name. Player LName contains the text for the player's last name. Player number contains the text for the players uniform number. Player Team ID is the Numeric ID of the team linking to the Team table to identify the team a player is associated with. User Defined Field 1 and User Defined Field 2 are for expansion or periodic special events requirements.

Another database table is used to track and maintain Team information (Team Table 179). The ID is used by the Video Clip Table, Game Table and Player Table to identify the team(s) associated with each record. Team Name contains the text for the team name. Home town contains the is town, province or local text description team home base. Country is text describing the country the team located in. User Defined Field 1 and User Defined Field 2 are for expansion or periodic special events requirements.

It should be understood that many variations are possible based on the disclosure herein. Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

What is claimed is:

1. A process comprising:
receiving, at a touch screen interface of a virtual game console, a human user input to initiate a virtual sports-based game that is automatically played between virtual sports-based teams without additional human user inputs during game play, the virtual game console having a housing that encompasses the virtual game console, the housing having a housing window through which a display device is visible, the display device having integrated therein the touch screen interface positioned within a corner portion of the display device without integration into any other portion of the display device;
storing, with a video clip database positioned within the virtual game console in proximity to the display device, a plurality of prerecorded video clips of one or more archived real-world sports-based team events, the video clip database being locally accessible by the display device;
storing, within the video clip database, a video clip data structure, the video clip data structure storing, for each of the plurality of prerecorded video clips, an index number, a pointer to one of the virtual sports-based teams, a pointer to a real-world sports-based team event in which said one of the virtual sports-based teams participated, a pointer to one or more actions occurring within the real-world sports-based team event, a link to a real-world physical location of the real-world sports-based team event, and a video clip length;
randomly selecting, with a processor positioned within the virtual game console, a quantity of video clips for playback during the virtual sports-based game;
randomly selecting, with the processor, a subset of the plurality of prerecorded video clips that meet a predetermined time interval criterion according to the video clip data structure;
automatically rendering, with the display device, the subset of the plurality of prerecorded video clips in a sequence of predetermined time intervals; and
automatically determining, with the processor, an outcome of the virtual sports-based game based solely on game activity between virtual participants in the subset of the plurality of prerecorded video clips.

2. The process of claim 1, further comprising determining, with the processor, a fixed maximum time for the display device to render the subset of the plurality of prerecorded video clips, the fixed maximum time equaling five minutes.

* * * * *